United States Patent [19]

Shinto

[11] Patent Number: 5,170,085
[45] Date of Patent: Dec. 8, 1992

[54] ROTOR FOR ROTARY MACHINE WITH PERMANENT MAGNETS

[75] Inventor: Masayuki Shinto, Takefu, Japan

[73] Assignee: Matsushita Electric Industrial Co., Ltd., Osaka, Japan

[21] Appl. No.: 749,605

[22] Filed: Aug. 26, 1991

[30] Foreign Application Priority Data

Aug. 29, 1990 [JP] Japan .................. 2-229366

[51] Int. Cl.$^5$ .......................................... H02K 21/12
[52] U.S. Cl. ...................... 310/156; 310/42; 310/261; 310/271
[58] Field of Search .................. 310/156, 89, 42, 262, 310/261, 271; 335/302, 306; 29/598

[56] References Cited

U.S. PATENT DOCUMENTS

| | | | |
|---|---|---|---|
| 2,060,260 | 11/1936 | Spengler | 310/156 UX |
| 2,334,157 | 11/1943 | Morath | 310/156 UX |
| 3,112,464 | 11/1963 | Rataski | 310/10 |
| 4,714,852 | 12/1987 | Kawada | 310/156 |
| 4,910,861 | 3/1990 | Dohogne | 310/156 |
| 5,040,286 | 8/1991 | Stark | 310/42 |

FOREIGN PATENT DOCUMENTS

| | | | |
|---|---|---|---|
| 02327 | 7/1956 | Fed. Rep. of Germany | 310/156 |
| 0020161 | 2/1982 | Japan | 310/156 |
| 58-151855 | 9/1983 | Japan . | |
| 0206859 | 8/1989 | Japan | 310/156 |

Primary Examiner—R. Skudy
Attorney, Agent, or Firm—Wenderoth, Lind & Ponack

[57] ABSTRACT

A rotor for a rotary machine with permanent magnets includes an iron core member, permanent magnets, each having an arcuate cross section and arranged on an outer periphery of the iron core member, and a non-magnetic metallic pipe applied, under pressure, over outer peripheries of arcuate magnets. Each of the arcuate magnets is formed with chamfering on one end portion on its outer circumferential face in an axial direction, and the chamfering is small at its central portion, and becomes larger towards opposite sides in a widthwise direction of the arcuate magnet.

1 Claim, 7 Drawing Sheets

ROTOR FOR ROTARY MACHINE WITH PERMANENT MAGNETS

BACKGROUND OF THE INVENTION

The present invention generally relates to a rotary machine, and more particularly, to a rotor of a rotary machine with permanent magnets, which includes an iron core in a position close to its inner diameter, and permanent magnets disposed therearound.

Generally, a rotor of a rotary machine with permanent magnets not provided with a starting winding is so constructed that, with an iron core portion disposed inside, permanent magnets are arranged at an outer side thereof so as to increase the magnet area.

For efficiently producing the rotor having such a construction, there has often been adopted a practice as disclosed, for example in Japanese Laid-Open Patent Publication Tokkaisho No. 58-151855, in which, with a plurality of magnets each having an arcuate cross section being disposed inside a cylindrical cover member, laminated iron plates having an opening for passing molten metal therethrough during die-casting are further disposed within the portion surrounded by said plurality of magnets, and thereafter, molds each having an annular space communicated with said opening of the laminated iron plates are applied onto opposite end faces for die-casting.

In the prior art as disclosed in the Tokkaisho No. 58-151855 referred to above, however, since the die-casting is required, not only is the installation cost increased, but dimensional accuracy for an inner diameter of the laminated iron core and an outer diameter of the cylindrical cover is undesirably deteriorated by heat and pressure during pouring of the molten metal, thus requiring cutting processing after the die-casting.

In order to overcome the disadvantages as described above, there has recently been proposed a rotor for a rotary machine with permanent magnets having the construction as shown in FIGS. 5 and 6. In the above prior art arrangement, a plurality of magnets 2 each having an arcuate cross section are disposed around an outer periphery of a cylindrical laminated iron plate core 1, and a non-magnetic metallic pipe 3 is forcibly applied over the outer peripheries of said plurality of magnets 2, thereby to dispense with the die-casting. As shown in FIGS. 7(a) and 7(b), and FIG. 8, each of the magnets 2 having the arcuate cross section is formed, at one end portion (or both end portions) on its outer circumferential face in an axial direction thereof, with chamfering 4a of a uniform width and directed to be parallel with said one end portion (or said both end portions).

However, in the prior art rotor as described above, during application of the non-magnetic metallic pipe 3 over the outer peripheries of the magnets 2 under pressure, there have been many cases where the pipe 3 can not withstand the pressure for the application, with seizure as indicated by arrows 6 in the inner periphery of said pipe 3 or collapsing 7 of said pipe 3 taking place as shown in FIGS. 9 and 10, thus resulting in the faulty products. Such a defect is attributable to the fact that distribution of the pressure (indicated by arrows 5 (FIG. 11(b)) on the contact surfaces between the pipe 3 and the permanent magnets 2 at the moment of forcible application of the pipe 3 over the magnets 2 is concentrated at portions between the neighboring permanent magnets 2 as shown in FIGS. 11(a) and 11(b).

SUMMARY OF THE INVENTION

Accordingly, an essential object of the present invention is to provide a rotor for a rotary machine with permanent magnets in which, in a process for forcibly applying a non-magnetic metallic pipe over permanent magnets during manufacture of the rotor, the inner periphery of the non-magnetic metallic pipe is free from generation of seizure or collapsing, with substantial elimination of disadvantage inherent in the conventional arrangements of this kind.

Another object of the present invention is to provide a rotor of the above described type which is simple in construction and stable in functioning, and can be readily manufactured at low cost.

In accomplishing these and other objects, according to one preferred embodiment of the present invention, there is provided a rotor for a rotary machine with permanent magnets, which includes an iron core member, a plurality of permanent magnets each having an arcuate cross section and arranged on an outer periphery of the iron core member, and a non-magnetic metallic pipe applied, under pressure, over outer peripheries of the plurality of arcuate magnets Each of the plurality of arcuate magnets is formed with chamfering on one end portion on its outer circumferential face in an axial direction, and the chamfering is set to be small at its central portion, and to become larger towards opposite sides in a widthwise direction of the arcuate magnet.

By the arrangement according to the present invention as described above, in the process of forcibly applying the non-magnetic metallic pipe over the permanent magnets, since the configuration of the chamfering provided on one end portion on the outer circumferential face in the axial direction of each magnet is in the form of an arch, which is narrow at the central portion, and gradually enlarged towards opposite sides along the width of the arcuate magnet, the pressure to the pipe during the forcible application thereof is advantageously dispersed, whereby the seizure or collapsing in the inner periphery of said pipe can be prevented

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
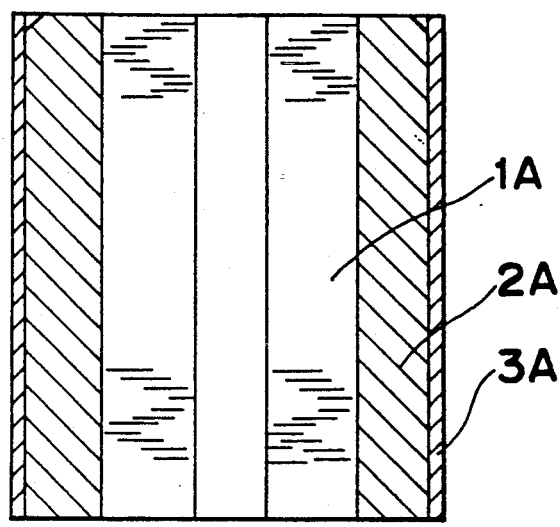
FIG. 1 is a vertical cross section of a rotor for a rotary machine with permanent magnets according to one preferred embodiment of the present invention.
Figure 2:
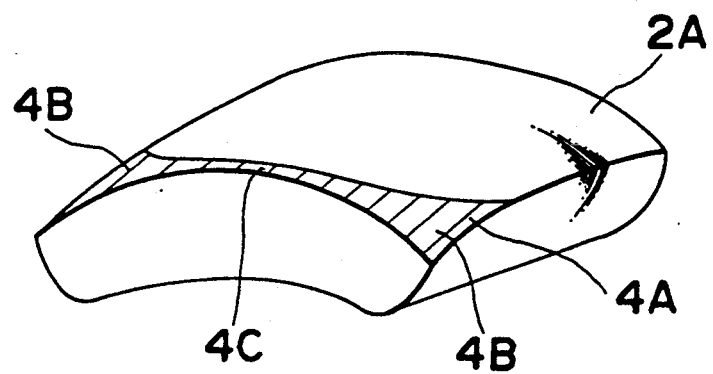
FIG. 2 is a perspective view showing one of the permanent magnets which may be employed in the rotor of FIG. 1.

Before the description of the present invention proceeds, it is to be noted that like parts are designated by like reference numerals throughout the accompanying drawings.

Referring now to the drawings, FIG. 1 shows a rotor for a rotary machine with permanent magnets according to one preferred embodiment, which includes an iron core member, 1A, for example, of a cylindrical laminated iron plate core or solid iron core, a plurality of permanent magnets 2A each having an arcuate cross section and arranged on an outer periphery of the iron core member 1A, and a metallic pipe 3A of a non-magnetic metallic material forcibly applied under pressure, over outer peripheries of said plurality of arcuate magnets 2A.

As shown in FIGS. 2, and 3(a) to 3(c), each of the plurality of permanent magnets 2A having the arcuate cross section is formed with chamfered portion or chamfering 4A on one end portion on its outer circumferential face in an axial direction thereof. The chamfering 4A is formed at an angle $\theta$ with respect to the upper surface of the permanent magnet 2A (FIG. 3(b)), and is shaped to be small or narrow at its central portion 4C and to be larger towards opposite sides 4B in a widthwise direction of said one end portion of said arcuate permanent magnet 2A (FIGS. 3(a),3(c)).

Figure 4A:
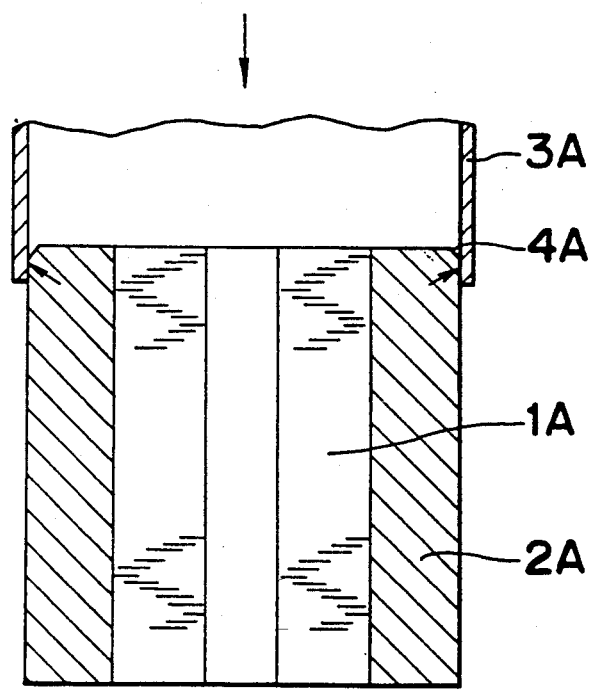
FIG. 4(a) and 4(b) are respectively a vertical cross section and a side cross section of a rotor for a rotary machine with permanent magnets according to the present invention, particularly showing distribution of pressure at contact surfaces between the permanent magnet and non-magnetic metallic pipe at the moment of forcible application of said pipe onto the permanent magnets.
Figure 4B:
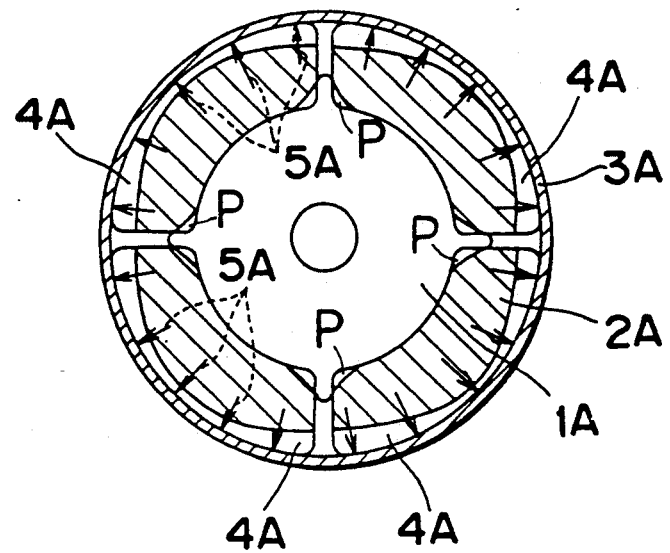
Figure 5:
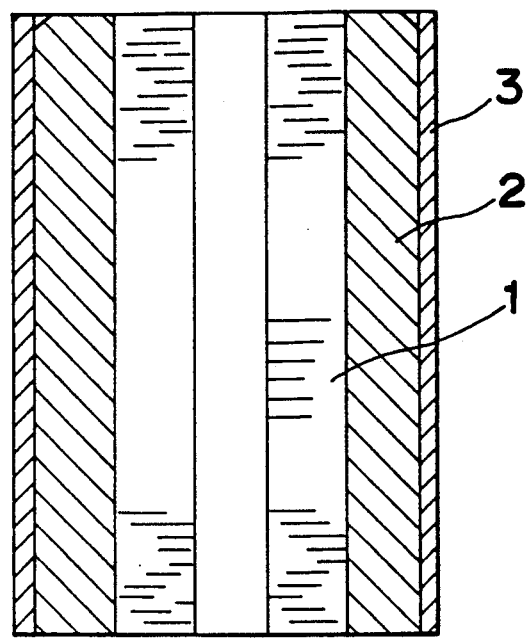
FIGS. 5 and 6, are respectively a vertical cross section and a side cross section showing construction of a conventional rotor for a rotary, machine with permanent magnets (already referred to)
Figure 6:
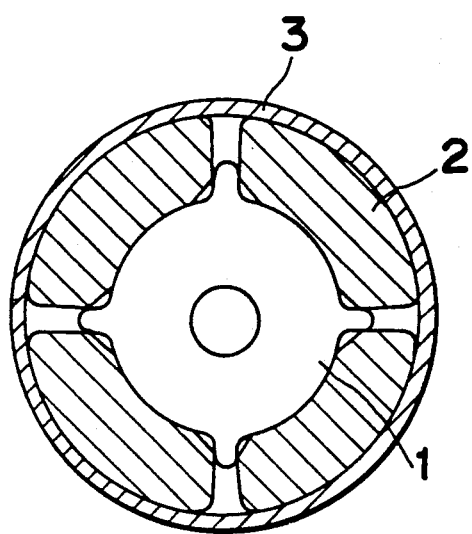
Figure 7A:
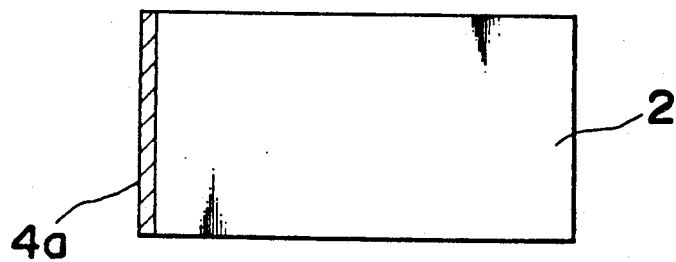
FIGS. 7(a) and 7(b) are respectively a top plan view and a side elevational view of a permanent magnet employed in the conventional rotor (already referred to)
Figure 7B:
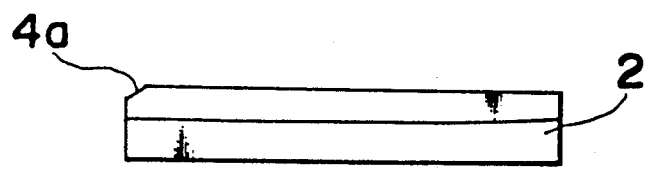
Figure 8:
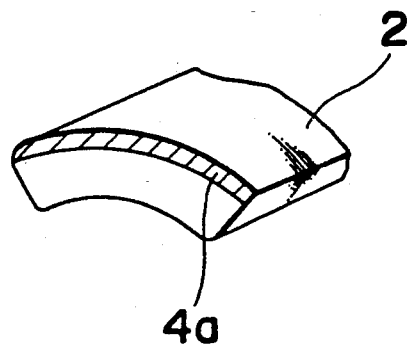
FIG. 8 is a fragmentary perspective view of a conventional permanent magnet (already referred to)
Figure 9:
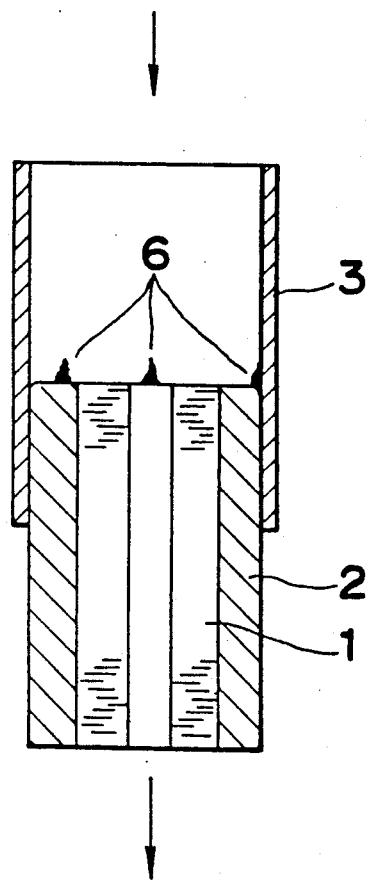
FIG. 9 is a vertical cross section of a conventional rotor for explaining seizure at the inner periphery of the non-magnetic metallic pipe which may take place in the process for forcibly applying said pipe onto permanent magnets (already referred to)
Figure 10:
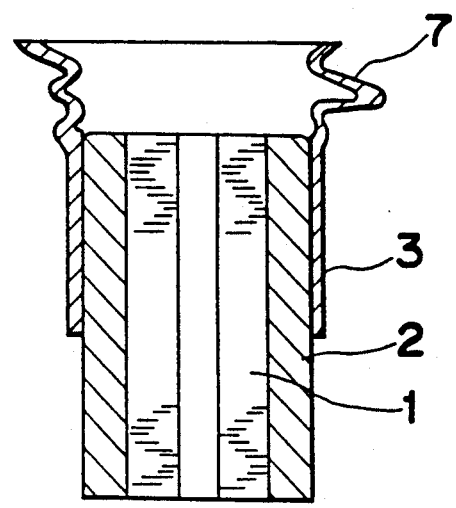
FIG. 10 is a vertical cross section of a conventional rotor for explaining collapsing of the nonmagnetic metallic pipe which may take place in the process for forcibly applying said pipe onto the permanent magnets (already referred to)
Figure 11A:
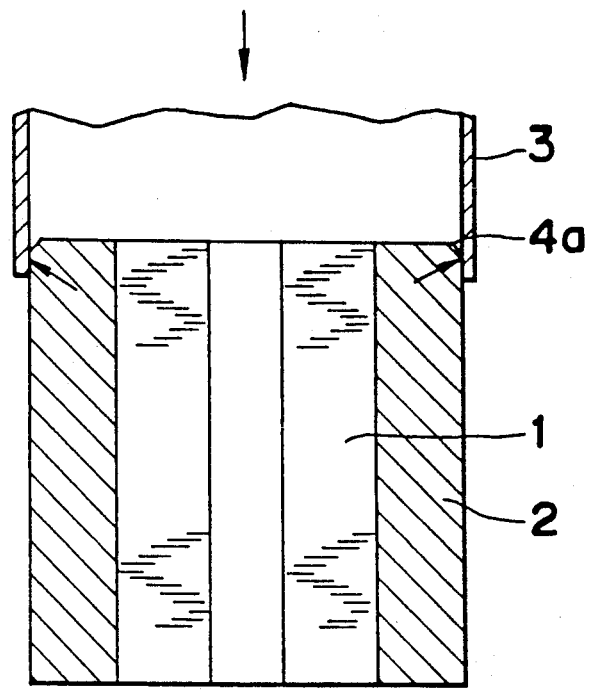
FIGS. 11(a) and 11(b) are respectively a vertical cross section and a side cross section of a conventional rotor for a rotary machine with permanent magnets, particularly showing distribution of pressure at contact surfaces between the permanent magnet and non-magnetic metallic pipe at the moment of forcible application of said pipe onto the permanent magnets (already referred to).
Figure 11B:
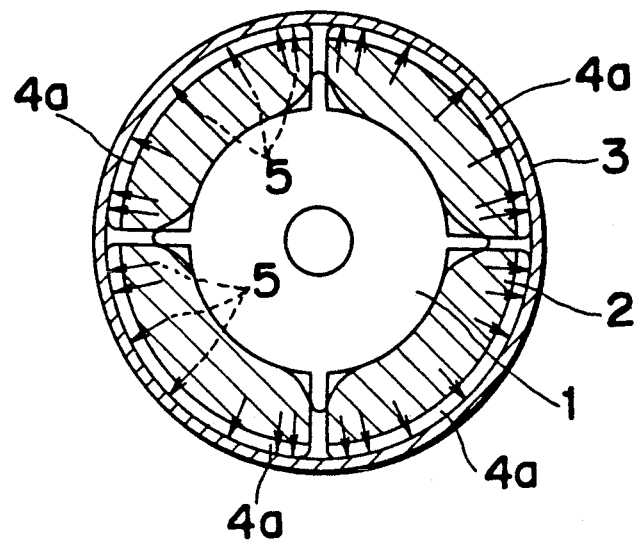

By the above arrangement according to the present invention, as shown in FIGS. 4(a) and 4(b), at the moment when the non-magnetic metallic pipe 3A is forcibly applied, under pressure, over the plurality of permanent magnets 2A arranged around the iron core member 1A which include a plurality of radially extending projection, distribution of pressure indicated by arrows 5A at the contact surfaces between the permanent magnets 2A and the non-magnetic metallic pipe 3A becomes uniform (FIG. 4(b)), without any concentration at portions between the neighboring permanent magnets 2A.

As is clear from the foregoing description, owing to the uniform distribution of the pressure at the contact surfaces between the permanent magnets and the metallic pipe upon application of said pipe over the permanent magnets under pressure, without concentration of pressure between the neighboring magnets, generation of seizure at the inner periphery of the metallic pipe or collapsing of the pipe as in the conventional arrangement may be advantageously prevented, and consequently, the rotor for the rotary machine with permanent magnets, stable in functioning and superior in quality may be provided at low cost.

Figure 3A:
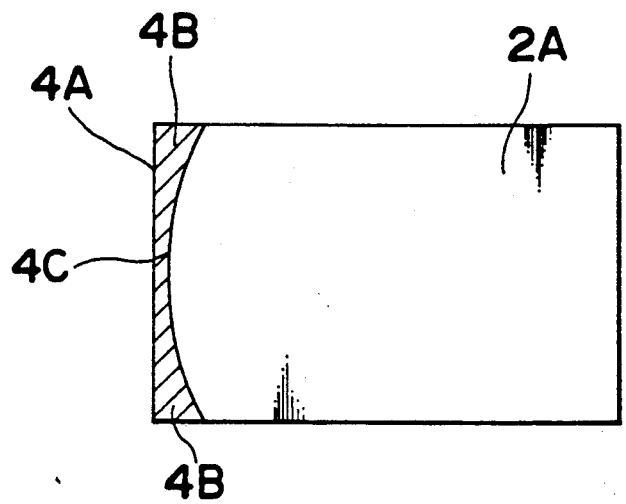
FIGS. 3(a) to 3(c) are respectively a top plan view, a side elevational view and a front elevational view of the permanent magnet which may be employed in the rotor of FIG. 1, particularly showing the configuration of a chamfering formed thereon.
Figure 3B:
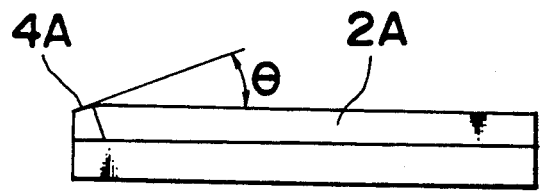
Figure 3C:
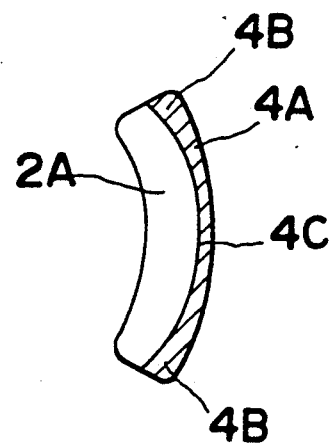

It is considered that the angle $\theta$ for the chamfering 4A (FIG. 3(b)) should preferably be small from the view point of commonly accepted concept.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A rotor for a rotary machine with permanent magnets, which comprises a cylindrical laminated iron core member formed by laminating iron plates each having a plurality of projections at its outer periphery, a plurality of arcuate permanent magnets each having an arcuate cross section and arranged on the outer periphery of said cylindrical laminated iron core member sectioned by said projections, and a non-magnetic metallic pipe applied, under pressure, over outer peripheries of said plurality of arcuate permanent magnets, each of said plurality of arcuate permanent magnets being formed with chamfering on one end portion on its outer circumferential face in an axial direction thereof, said chamfering being small at its central portion, and symmetrically becoming larger, with approximately a same dimension, towards opposite end portions.

* * * * *